(12) United States Patent
Chiussi et al.

(10) Patent No.: US 7,027,457 B1
(45) Date of Patent: Apr. 11, 2006

(54) METHOD AND APPARATUS FOR PROVIDING DIFFERENTIATED QUALITY-OF-SERVICE GUARANTEES IN SCALABLE PACKET SWITCHES

(75) Inventors: Fabio M. Chiussi, Long Branch, NJ (US); Andrea Francini, Eatontown, NJ (US)

(73) Assignee: Agere Systems Inc., Allentown, PA (US)

( * ) Notice: Subject to any disclaimer, the term of this patent is extended or adjusted under 35 U.S.C. 154(b) by 933 days.

(21) Appl. No.: 09/599,250

(22) Filed: Jun. 22, 2000

Related U.S. Application Data

(60) Provisional application No. 60/168,989, filed on Dec. 3, 1999.

(51) Int. Cl.
*H04L 12/56* (2006.01)
(52) U.S. Cl. ..................................... 370/414

(58) Field of Classification Search ......... 370/412–414
See application file for complete search history.

(56) References Cited

U.S. PATENT DOCUMENTS 5,579,312 A * 11/1996 Regache .................. 370/397
6,067,298 A * 5/2000 Shinohara .............. 370/395.71

FOREIGN PATENT DOCUMENTS

JP            6-284453     * 10/1994

* cited by examiner

*Primary Examiner*—Chi Pham
*Assistant Examiner*—Ronald Abelson

(57) ABSTRACT

The invention comprises a method and apparatus for providing differentiated Quality-of-Service (QoS) guarantees in scalable packet switches. The invention advantageously uses a decentralized scheduling hierarchy to regulate the distribution of bandwidth and buffering resources at multiple contention points in the switch, in accordance with the specified QoS requirements of the configured traffic flows.

21 Claims, 10 Drawing Sheets

INGRESS PORT CARD

METHOD AND APPARATUS FOR PROVIDING DIFFERENTIATED QUALITY-OF-SERVICE GUARANTEES IN SCALABLE PACKET SWITCHES

This application claims benefit of U.S. Provisional Patent Application Ser. No. 60/168,989, which was filed on Dec. 3, 1999 and is incorporated herein by reference in its entirety.

BACKGROUND OF THE DISCLOSURE

1. Technical Field of the Invention

The present invention relates to communication systems generally and, in particular, to a method and apparatus for providing differentiated Quality-of-Service guarantees to data transfer sessions in packet switches having multiple contention points.

2. Description of the Background Art

The continuous growth in the demand for diversified Quality-of-Service (QoS) guarantees in broadband data networks introduces new challenges in the design of packet switches that are scalable to large switching capacities. Packet scheduling is the most critical function involved in the provisioning of individual QoS guarantees to the switched packet streams, also referred to as traffic flows. Moreover, present scheduling techniques assume the presence in the switch of a single contention point residing in front of the outgoing links. Such an assumption is not consistent with the highly-distributed nature of many popular architectures for scalable switches, which typically have multiple contention points located in both ingress and egress port cards, as well as in the switching fabric.

Progress has been made in the formalization of theoretical frameworks identifying and characterizing scheduling techniques that are capable of enforcing QoS guarantees for end-to-end packet streams, in terms of one or more of the following: throughput, delay, delay jitter, and fairness. However, most of this work has focused on a single scheduler that operates in isolation to handle traffic flows with a homogenous set of QoS requirements.

Unfortunately, present solutions do not adequately address the adaptation of the available scheduling techniques to the currently dominating switch architectures. Switches that can scale to large aggregate capacities typically feature highly distributed architectures, where the majority of the buffers and basic functionalities are located in the port cards that interface with the incoming and outgoing links. Such decentralized architectures are cost effective, since they can take advantage of low-cost high-density memory technology to implement the buffers, and are desirable due to their ease of implementation, their flexibility in supporting different switch configurations, and their intrinsic modularity in scaling to large switch sizes.

SUMMARY OF THE INVENTION

The invention comprises a method and apparatus for providing differentiated Quality-of-Service (QoS) guarantees in scalable packet switches. The invention advantageously uses a decentralized scheduling hierarchy to regulate the distribution of bandwidth and buffering resources at multiple contention points in the switch, in accordance with the specified QoS requirements of the configured traffic flows.

A method for transferring data packets through a packet switch while providing differentiated Quality-of-Service (QoS) guarantees to respective traffic flows, according to the present invention, comprises the steps of: storing incoming data packets associated with configured traffic flows in a respective plurality of input buffers, grouping the configured traffic flows, selecting data packets from the configured traffic flows stored in the respective plurality of input buffers according to a first plurality of schedulers for transmission to a switch fabric, assigning bandwidth to the data packets according to a second plurality of schedulers for transmission to the switch fabric, storing the transmitted data packets in a plurality of output buffers in the switch fabric, determining whether the occupation of any of a plurality of the output buffers has exceeded a threshold parameter, the first plurality of schedulers the said second plurality of schedulers being responsive to the step of determining, and choosing the data packets to be transmitted out of the plurality of output buffers according to a third plurality of schedulers.

An apparatus for transferring data packets through a packet switch while providing differentiated Quality-of-Service (QoS) guarantees, according to the present invention, comprises: a first plurality of schedulers for selecting traffic flows arranged in groups; a second plurality of schedulers coupled to the first plurality of schedulers for assigning bandwidth to the selected groups of traffic flows; a plurality of input buffers, coupled to the first and second pluralities of schedulers, for holding data packets associated with the grouped traffic flows; a third plurality of schedulers, coupled to the second plurality of schedulers for selecting data packets for transmission to respective output ports; plurality of output buffers, coupled to the third plurality of schedulers, for holding data packets before transmission to the respective output ports; and a backpressure-signal circuit connected between each of the respective plurality of input buffers and each of the respective plurality of output buffers, transmitting a stop-transmission signal to each of the respective plurality of input buffers when a threshold parameter in any of the respective plurality of output buffers is exceeded.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
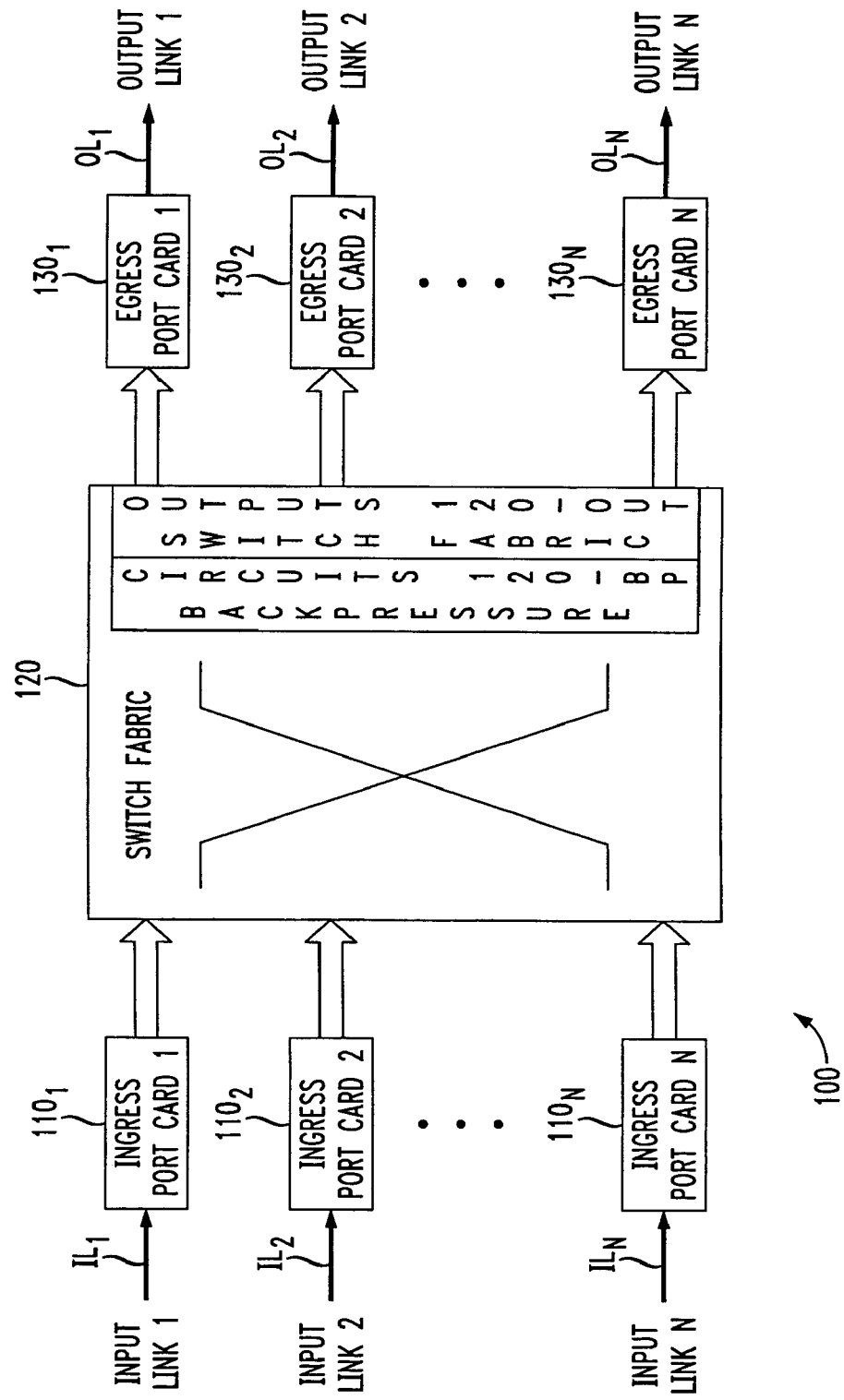
FIG. 1 depicts a high-level block diagram of a multi-module N×N packet switch.

FIG. 1 depicts a multi-module N×N packet switch. The N×N packet switch comprises a plurality of ingress port cards $110_1$, $110_2$, and so on up to $110_N$ (collectively ingress port cards 110), a switch fabric 120 including a plurality of switch fabric outputs depicted as switch fabric outputs 120-OUT comprising switch fabric outputs $120_1$, $120_2$ and so on up to $120_N$ (not shown), and a plurality of egress port cards $130_1$, $130_2$ and so on up to $130_N$ (collectively egress port cards 130). Each of the ingress port cards 110 receives a respective plurality of data packets associated with con-figured traffic flows, via a respective input link $IL_1$, $IL_2$, and so on up to $IL_N$ (collectively input links IL), and operates to group individual traffic flows in Quality of Service (QoS) classes. Each of the egress port cards 130 provides a respective plurality of packets associated with configured traffic flows via a respective output link $OL_1$, $OL_2$, and so on up to $OL_N$ (collectively output links OL). The switching fabric 120 operates to selectively couple individual packet streams, as grouped according to Quality-of-Service (QoS) classes and as further grouped according to originating ingress port cards 110 and destination egress port cards 130, to the switch fabric outputs 120-OUT. The switch fabric outputs 120-OUT provide the packets associated with the configured traffic flows to the egress port cards 130, and perform buffer management and scheduling functions to be described in more detail below.

A configured data flow is a data flow to which some memory has been reserved within the system to accommodate the information associated with the data flow. Typically, data is inserted within the header portion of data packets forming the data flow to indicate that the flow has been configured by, for example, a configuration manager.

Packet streams having different QoS requirements enter the ingress port cards 110 via the input links IL. The QoS requirements may be stated, for instance, in terms of data transfer rate, data transfer delay, and jitter in data transfer delay. Other QoS parameters may be defined, as known to those skilled in the art.

At the ingress port cards 110, a first scheduling is performed on the arriving packets which are stored in a plurality of input buffers (not shown), and the first scheduled packets are transmitted to the switch fabric 120, and therein routed to the switch fabric outputs 120-OUT, in order of priority based on QoS requirements for the associated traffic flows. The first scheduling will be described in more detail below with respect to FIG. 2.

At the switch fabric outputs 120-OUT, a second scheduling is performed on the arriving packets, and the second scheduled packets are transmitted to their destination egress port cards 130 in order of priority based on QoS requirements for the associated traffic flows. The second scheduling will be described in more detail below with respect to FIG. 3.

After the arriving packets are placed in a respective plurality of output buffers (not shown), backpressure circuits 120-BP determine whether the occupation in each of the respective plurality of output buffers used to store the arriving packets has exceeded the associated threshold. If the occupation threshold has been exceeded for one or more of the plurality of output buffers, a backpressure signal is sent to the ingress port cards 110 that transmitted the packets to the plurality of output buffers. The ingress port cards 110 will no longer transmit traffic to the congested plurality of output buffers until backpressure circuits 120-BP transmit a resume-transmission signal to the ingress port cards 110. In this way, buffer overflow is avoided in the switch fabric.

Once a data packet, associated with a respective traffic flow, is scheduled for transmission at one of the switch fabric outputs 120-OUT, the data packet is transmitted to one of the corresponding egress port cards 130. The data packet is then transmitted out of the egress port card to one of the corresponding plurality of output links OL.

It should be noted that for purposes of clarity the description of the present invention is based on the assumption that no demultiplexing is performed at the egress port cards 130 and that the input and output interfaces of the switch fabric 120 all operate at the same data transfer rate. Similarly, any other functionality that could contribute to the accumulation of packets in the egress port cards 130, such as the reassembly of packets previously segmented into smaller units at the ingress port cards 110, is not depicted in the diagram or described herein. As a result, no buffers nor scheduling mechanisms are needed in the egress port cards 130 of the considered switch model, and all critical functionalities are confined within the switch fabric 120 and the ingress port cards 110. However, it will be appreciated that such functionalities may be incorporated into the various embodiments of the present invention.

Figure 2:
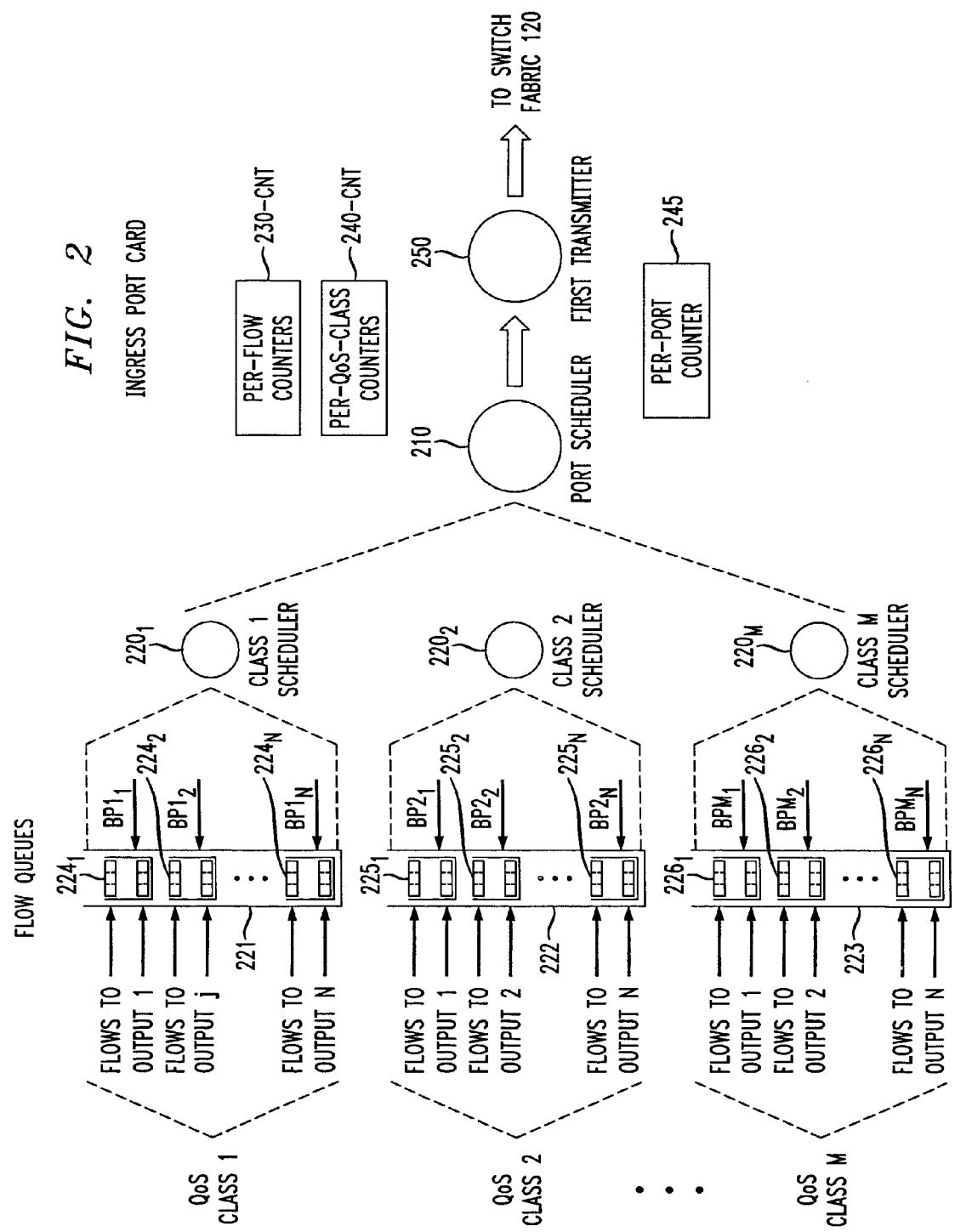
FIG. 2 depicts a high-level block diagram of an ingress port card suitable for use in the multi-module N×N packet switch of FIG. 1.

FIG. 2 depicts a high-level block diagram of an ingress port card suitable for use in the multi-module N×N packet switch of FIG. 1. Specifically, an ingress port card $110_1$ provides a first QoS class grouping denoted as Class 1. Grouped within QoS Class 1 are traffic flows, which are streams of data packets that have identical bit patterns in portions of their headers and are destined for the same egress port card 130. Each traffic flow is associated with a corresponding one of a plurality of flow queues 221, which consists of one or more input buffers where arriving packets are stored while waiting for transmission, and from which stored data packets are transmitted in First-In-First-Out (FIFO) order. The group of traffic flows associated with QoS Class 1 is further divided into N per-output subgroups $224_1$, $224_2$, up to $224_N$ (collectively per-output subgroups 224) of traffic flows, each per-output subgroup including traffic flows destined for a given switch fabric output. Coupled to each flow of QoS Class 1 is one of a plurality of counters 120-OUT for counting the number of packets within the associated flow queue. Coupled to QoS Class 1 is one of a plurality of counters 240-CNT for counting the number of backlogged flows in QoS Class 1, a backlogged flow being a traffic flow whose associated flow queue 221 contains data packets waiting to be transmitted. Each of the per-output subgroups 224 receives a respective backpressure signal, designated as $BP1_1$, $BP1_2$, and so on up to $BP1_N$ (collectively backpressure signals BP1). A first class scheduler $220_1$ is coupled to QoS Class 1. The QoS Class 1 scheduler $220_1$, provides a candidate traffic flow for QoS Class 1 to a port scheduler 210 which, in turn, selects one QoS class for service and passes a data packet from the candidate flow of the selected QoS class to a first transmitter 250-TRAN.

The ingress port card $110_1$ also provides a second QoS class grouping denoted as QoS Class 2. The traffic flows of QoS Class 2 are further divided into a second set of per-output subgroups $225_1$, $225_2$, up to 225N (collectively per-output subgroups 225). Coupled to each flow of QoS Class 2 is one of a plurality of flow queues 222 and one of a plurality of counters 230-CNT for counting the number of packets within the associated flow queue. Coupled to QoS Class 2 is one of a plurality of counters 240-CNT for counting the number of backlogged flows in QoS Class 2. Each of the per-output subgroups 225 receives a respective backpressure signal, designated as $BP2_1$, $BP2_2$, and so on up to $BP2_N$ (collectively backpressure signals BP2). A second class scheduler $220_2$ is coupled to QoS Class 2. The QoS Class 2 scheduler $220_2$ provides a candidate traffic flow for QoS Class 2 to the port scheduler 210.

The ingress port card $110_1$ provides up to M QoS class groupings, where an M-th QoS class is denoted as QoS class M where M is an integer. The traffic flows of QoS Class M are further divided into a final set of per-output subgroups $226_1$, $226_2$, up to $226_N$ (collectively per-output subgroups 226). Coupled to each flow of QoS Class M is one of a plurality of flow queues 223 and one of a plurality of counters 230-CNT for counting the number of packets within the associated flow queue 223. Coupled to QoS Class M is one of a plurality of counters 240-CNT for counting the number of backlogged flows in QoS Class M. Each of the per-output subgroups 226 receives a respective backpressure signal, designated as $BPM_1$, $BPM_2$, and so on up to $BPM_N$ (collectively backpressure signals BPM). A QoS Class M scheduler $220_M$ is coupled to QoS Class M. The QoS Class M scheduler $220_M$ provides a candidate traffic flow for QoS Class M to the port scheduler 210.

In response to a backpressure signal BP indicative of a congestion condition in an output buffer of switch fabric 120, the per-output subgroup of traffic flows receiving the backpressure signal stops transmitting packets. In this manner, buffer overutilization conditions in the switch fabric outputs 120-OUT are resolved by restricting traffic flows at the ingress port cards 110.

In the ingress port card $110_1$, the configured traffic flows are grouped by QoS class and by destination into per-output subgroups. The class scheduler $220_1$ the operation of which will be discussed in more detail below with respect to FIGS. 6A and 6B, selects data packets from an active QoS class for transmission to the switch fabric 120. The activity of a QoS class is dependent on whether the QoS class has data packets waiting for transmission in any of the associated flow queues and whether the flow queues with data packets waiting to be transmitted are currently not subject to a stop-transmission backpressure signal. If the QoS class has one or more non-backpressured traffic flows with data packets waiting to be transmitted, the class scheduler 220 selects one of the traffic flows as the candidate for service for the QoS class, and passes it to the port scheduler 210. The port scheduler 210 assigns bandwidth to the QoS classes based on the aggregate requirements of the respective traffic flows. Coupled to the port scheduler 210 is a counter 245-CNT for counting the number of active QoS classes in the ingress port card. Whenever the first transmitter 250-TRAN completes the transmission of a data packet to the switch fabric or is idle, the port scheduler uses the bandwidth allocation for the QoS classes to select a QoS class for service. The selection of a QoS class implies the selection of the corresponding candidate traffic flow, and thereby of the first data packet in the flow queue associated with the candidate traffic flow. After identifying the data packet to be transmitted, the scheduler transfers the data packet to the first transmitter 250-TRAN.

Figure 3:
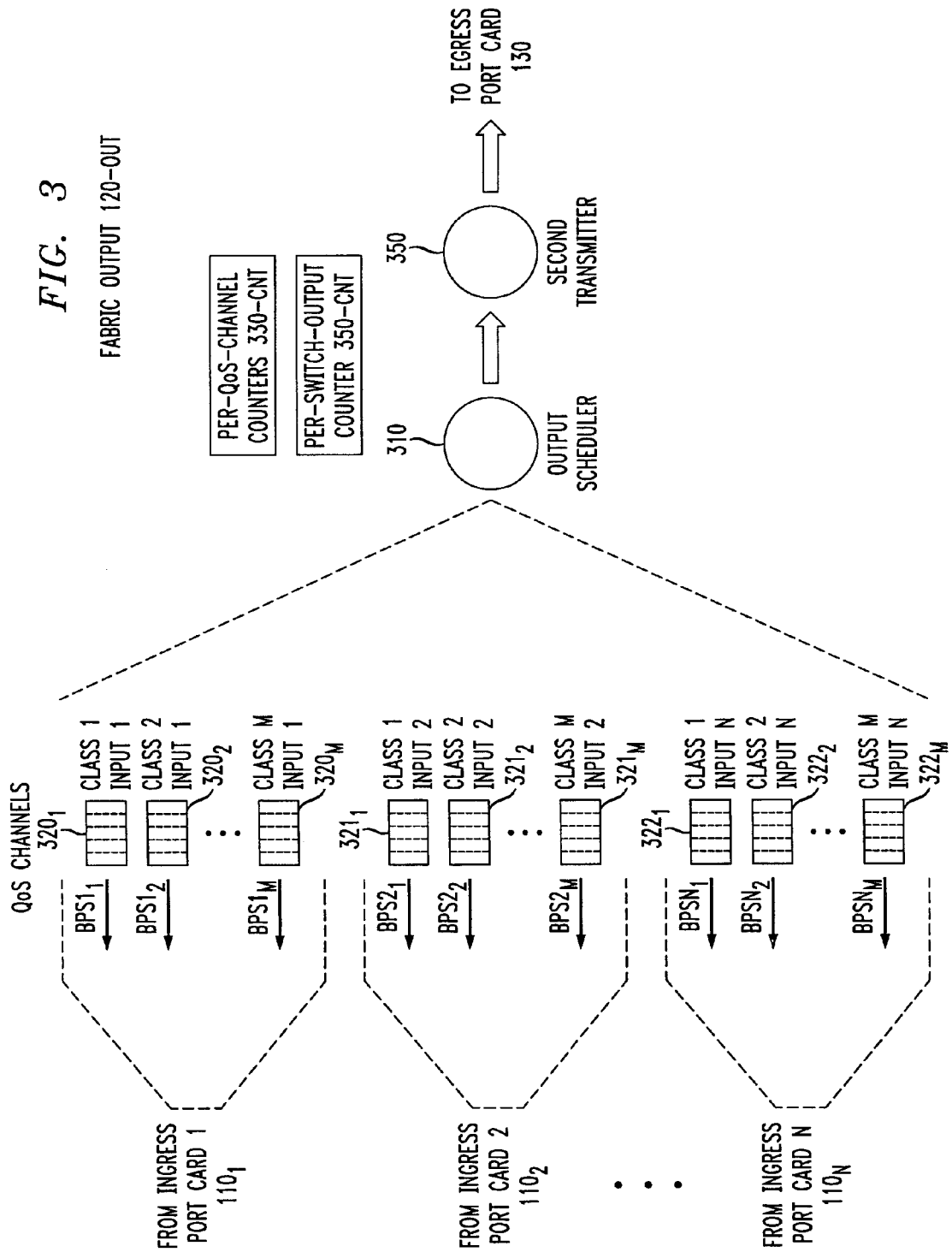
FIG. 3 depicts a high-level block diagram of a switch fabric output suitable for use in the multi-module N×N packet switch of FIG. 1.

FIG. 3 depicts a high-level block diagram of a switch fabric output suitable for use in the multi-module N×N packet switch of FIG. 1. Specifically, a switch fabric output 120-OUT$_1$, receives a first portion of traffic arriving from ingress port card $110_1$, a second portion of traffic arriving from ingress port card $110_2$, and so on up to an N-th portion of traffic arriving from ingress port card $110_N$. The data packets arriving from the ingress port cards 120 are stored in the switch fabric buffers and scheduled for transmission to appropriate egress port cards 130. In the case of overutilization of a particular buffer, the corresponding one of a plurality of backpressure circuits 120-BP, the operation of which will be discussed in more detail below with respect to FIG. 8, generates and propagates a stop-transmission backpressure signal to the ingress port card that provided the packets to the overutilized buffer.

The first portion of traffic arriving from ingress port card $110_1$ and destined for egress port card 130, is buffered in a first group of QoS channel queues $320_1$, $320_2$, up to $320_M$ (collectively QoS channel queues 320). QoS channel queue 320, buffers packets of QoS Class 1 going from ingress port card $110_1$ to switch fabric output 120-OUT$_1$. A QoS channel is the traffic aggregate of a QoS class going from a given input to a given output of the packet switch 100. QoS channel queue $320_2$ buffers packets of QoS Class 2 going from ingress port card $110_1$ to switch fabric output 120-OUT$_1$. QoS channel queue $320_M$ buffers packets of QoS Class M going from ingress port card $110_1$ to switch fabric output 120-OUT$_1$. Coupled to each of the QoS channel queues 320 is a respective backpressure signal $BPS1_1$, $BPS1_2$, up to $BPS1_M$ (collectively backpressure signals BPS1) originating from a backpressure circuit 120-BP$_1$, which is coupled to switch fabric output 120 OUT$_1$. A counter 350-CNT$_1$ for counting the number of backlogged QoS channels is coupled to switch fabric output 120-OUT$_1$. The QoS channel queues 320 are also coupled to an output scheduler 310 which, in turn, is coupled to a second transmitter 350.

The second portion of traffic arriving from ingress port card $110_2$ and destined for egress port card $130_1$ is buffered in a second group of QoS channel queues $321_1$, $321_2$, up to $321_M$ (collectively QoS channel queues 321). QoS channel queue $321_1$ buffers packets of QoS Class 1 going from ingress port card $110_2$ to switch fabric output 120-OUT$_1$. QoS channel queue $321_2$ buffers packets of QoS Class 2 going from ingress port card $110_2$ to switch fabric output 120-OUT$_1$. QoS channel queue $321_M$ buffers packets of QoS Class M going from ingress port card $110_2$ to switch fabric output 120-OUT$_1$. Coupled to each of the QoS channel queues 321 is a respective backpressure signal $BPS2_1$, $BPS2_2$, up to $BPS2_M$ (collectively backpressure signals BPS2) originating from the backpressure circuit 120-BP$_1$ The QoS channel queues 321 are also coupled to the output scheduler 310.

The N-th portion of traffic arriving from ingress port card $110_N$ and destined for egress port card $130_1$ is buffered in an N-th group of QoS channel queues $322_1$, $322_2$, up to $322_M$ (collectively QoS channel queues 322). QoS channel queue 322, buffers packets of QoS Class 1 going from ingress port card $110_N$ to switch fabric output 120-OUT$_1$. QoS channel queue $322_2$ buffers packets of QoS Class 2 going from ingress port card $110_N$ to switch fabric output 120-OUT$_1$. QoS channel queue $322_N$ buffers packets of QoS Class M going from ingress port card $110_N$ to switch fabric output 120-OUT$_1$. Coupled to each of the QoS channel queues 322 is a respective backpressure signal $BPSN_1$, $BPSN_2$, up to $BPSN_M$ (collectively backpressure signals BPSN) originating from the backpressure circuit 120-BP$_1$. The QoS channel queues 322 are also coupled to the output scheduler 310.

The data packets arriving from ingress port card $110_1$ are placed in the appropriate QoS channel queues 320. After placing an arriving data packet in a corresponding QoS channel queue 320, the buffer occupation of the QoS channel queue is checked against a corresponding backpressure threshold.

The backpressure circuits $120\text{-}BP_1$, $120\text{-}BP_2$, and up to $120\text{-}BP_N$ (collectively backpressure circuits 120-BP) generate a bitmap that conveys backpressure information to the ingress port cards 110 as an M×N×N bit matrix, with a distinct bit for each QoS channel in the switch fabric. The operation of the bitmap will be discussed in more detail with respect to FIGS. 7A, 7B, 8A and 8B. The application of selective backpressure with per-input, per-output, and per-QoS-class granularity, extends the buffer capacity of the switch fabric 120 by virtually aggregating the buffers located in the ingress port cards 110.

Based on a scheduling criterion, which will be discussed in more detail below with respect to FIGS. 8A and 8B, the output scheduler 310 performs scheduling on the QoS channels coupled to switch fabric output $120\text{-}OUT_1$ rather than on the individual configured traffic flows destined for the same switch output, which are instead scheduled as individual entities in the ingress port cards 110.

Figure 4:
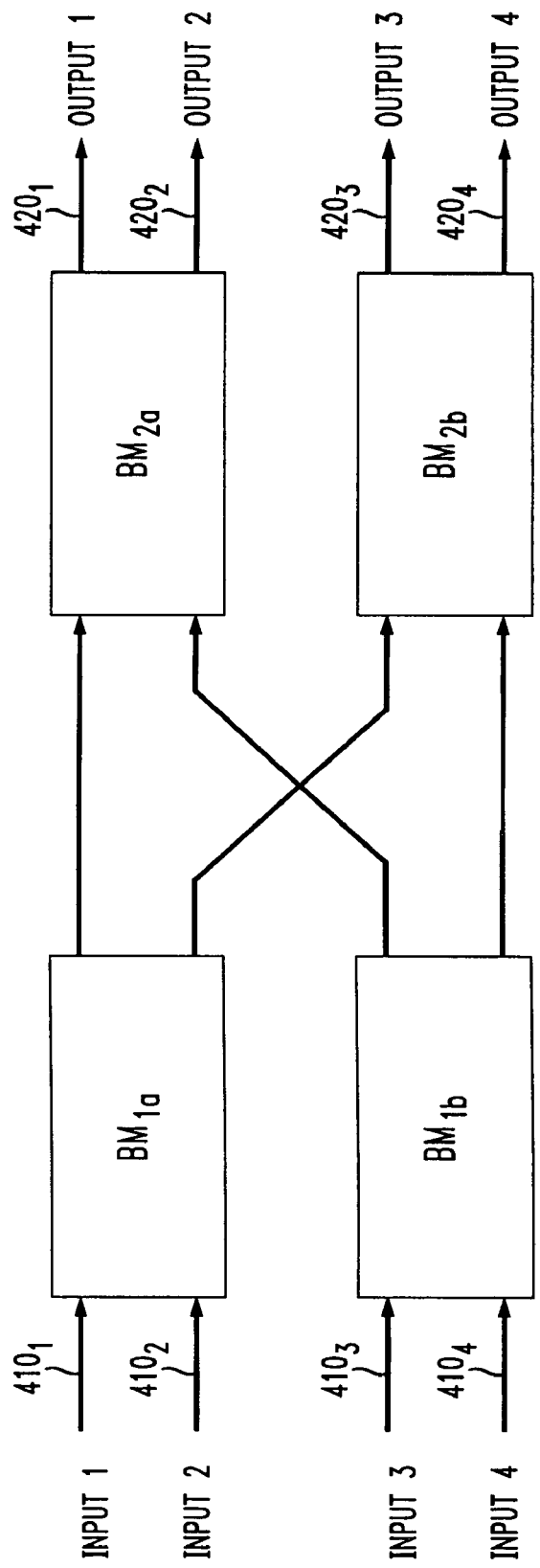
FIG. 4 depicts a high-level block diagram of a two-stage switch fabric with two modules per stage suitable for use in the multi-module N×N switch of FIG. 1.

FIG. 4 depicts a high-level block diagram of a two-stage switch fabric with two modules per stage, suitable for use in the multi-module N×N packet switch of FIG. 1 in the particular case where N is equal to 4. Specifically, the switch fabric of FIG. 4 comprises a first buffered module $BM_{1a}$ having a first input 410, and a second input $410_2$. The first buffered module $BM_{2a}$ provides an output to respective inputs of a second buffered module $BM_{2a}$ and of a third buffered module $BM_{2b}$. Buffered module $BM_{2a}$ has a first output $420_1$, and a second output $420_2$. The third buffered module $BM_{2b}$ has a third output $420_3$ and a fourth output $420_4$. A fourth buffered module $BM_{1b}$ has a third input $410_3$ and a fourth input $410_4$. The fourth buffered module $BM_{2b}$ provides an output to respective inputs of the second buffered module $BM_{2a}$ and to the third buffered module $BM_{2b}$.

The same principle of operation applies to a switch fabric 120 that has multiple modules as to a switch fabric 120 that consists of a single stage. Packets arriving at each buffered module of a multi-stage switch fabric such as the switch fabric of FIG. 4 are separated into distinct QoS channels based on their origin, destination, and QoS class. In each buffered module, the buffer occupation of each QoS channel is compared to a corresponding backpressure threshold, and a backpressure bitmap is generated accordingly to be propagated to the previous stage in the switch. In the two-stage switch fabric depicted in FIG. 4, the backpressure bitmaps generated by the second-stage buffered modules $BM_{2a}$ and $BM_{2b}$ are propagated to the first-stage buffered modules $BM_{1a}$ and $BM_{1b}$, wherein they affect the operation of the respective schedulers. The backpressure bitmaps generated by the first-stage buffered modules $BM_{1a}$ and $BM_{1b}$ are propagated to the ingress port cards 110, wherein they affect the operation of the respective schedulers.

Figure 5:
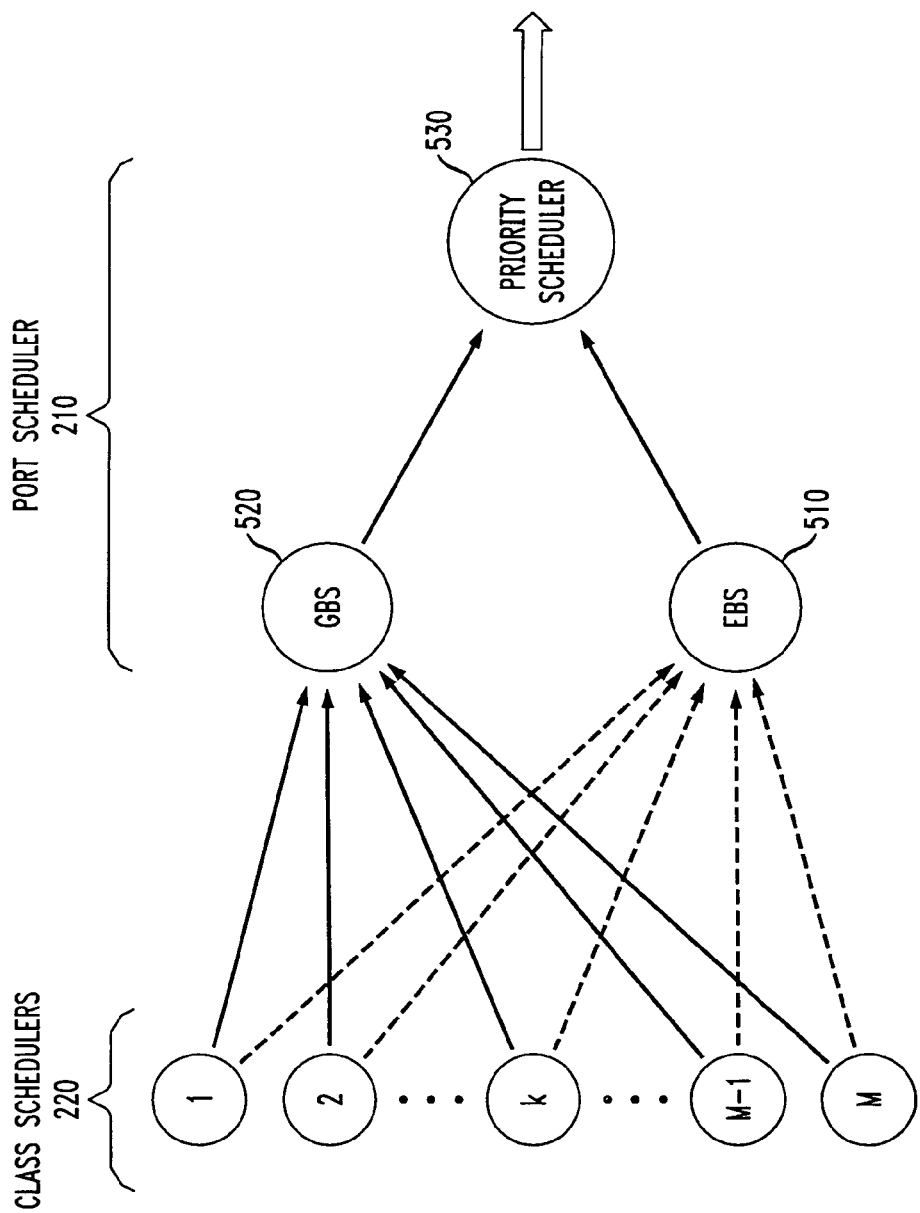
FIG. 5 depicts a high-level block diagram of a Guaranteed Bandwidth Scheduler (GBS) and an Excess Bandwidth Scheduler (EBS) useful in understanding the ingress port card diagram of FIG. 2 and the switch fabric output diagram of FIG. 3.

FIG. 5 depicts a high-level diagram of a Guaranteed Bandwidth Scheduler (GBS) and an Excess Bandwidth Scheduler (EBS) useful in understanding the ingress port card diagram of FIG. 2 and the switch fabric output diagram of FIG. 3. The EBS 510 and GBS 520 reproduce both the port scheduler 210 of FIG. 2 and the output scheduler 310 of FIG. 3; however, for purposes of simplicity, the description of FIG. 5 refers specifically to the port scheduler of FIG. 2.

The port scheduler 210 of FIG. 2 consists of a Priority Scheduler 530 that arbitrates the distribution of service to an EBS 510 and a GBS 520. In each of the ingress port cards 110, a priority scheduler 530 is coupled to both the EBS 510 and the GBS 520. Both the EBS 510 and GBS 520 are shown as being coupled to one or more of the class schedulers 220.

The GBS 520 is a non-work-conserving worst-case-fair Generalized Processor Sharing- (GPS-) related scheduler which satisfies the minimum bandwidth requirements of QoS classes with non-null allocated service rate. It is always possible for a QoS class to be allocated null rate at this scheduler. Among known GPS-related schedulers, for example, the Virtual Clock algorithm with Smallest Eligible Finishing potential First (SEFF) packet selection policy perfectly suits the specifics of the GBS 520.

The EBS 510 redistributes the unused GBS 520 bandwidth to all QoS classes that are backlogged. This makes the port scheduler 210 a work-conserving scheduler. The EBS 510, for example, can utilize the Self-Clocked Fair Queuing (SCFQ) algorithm. The assignment of the nominal EBS 510 rates to the QoS classes is regulated by the desired bandwidth-redistribution criterion. For example, the assignment of the same value of EBS 510 rate to all QoS classes emulates the round robin policy.

Illustratively, by implementing the GBS 520 as Virtual Clock with SEFF policy and the EBS 510 as SCFQ, the class scheduler 220 is required to maintain two distinct rates ($R_2$(GBS) and $R_2$(EBS)) and timestamps ($F_2$(GBS) and $F_2$(EBS)) for each QoS class 2. When a QoS class becomes backlogged, its GBS 520 and EBS 510 timestamps are both updated using the reserved service rates of the QoS class in the two schedulers and the respective system potentials. Whenever the first transmitter 250-TRAN is available for delivering a new data packet to the switch fabric 120, the GBS 520 looks for the minimum eligible GBS 520 timestamp, as required by the SEFF packet selection policy. If an eligible timestamp is found for a QoS class which is backlogged but non-backpressured, the QoS class is selected for transmission by the GBS 520, and the timestamp is incremented according to the GBS rate reserved for the QoS class.

On the other hand, if the GBS 520 does not detect any eligible GBS 520 timestamp, the EBS 510 looks for the minimum EBS 510 timestamp among backlogged and non-backpressured QoS classes and serves the corresponding QoS class. The EBS 510 system potential is first set to the value of the minimum EBS 510 timestamp in the system as specified in the SCFQ algorithm, and then the selected EBS 510 timestamp is updated according to the corresponding EBS 510 rate.

With regard to the preferred embodiment just described for the port scheduler 210 and output scheduler 310, means for differentiating the guarantees of the configured QoS classes and QoS channels are given by: (1) the instantiations of the scheduling algorithms used in the GBS 520 and EBS 510; (2) the assignment of the GBS 520 and EBS 510 rates to the QoS classes and QoS channels; (3) the assignment to the QoS channels of the thresholds for backpressure assertion; and (4) the instantiations of the class schedulers 220 used for the different QoS classes in the ingress port cards 110.

Figure 6A:
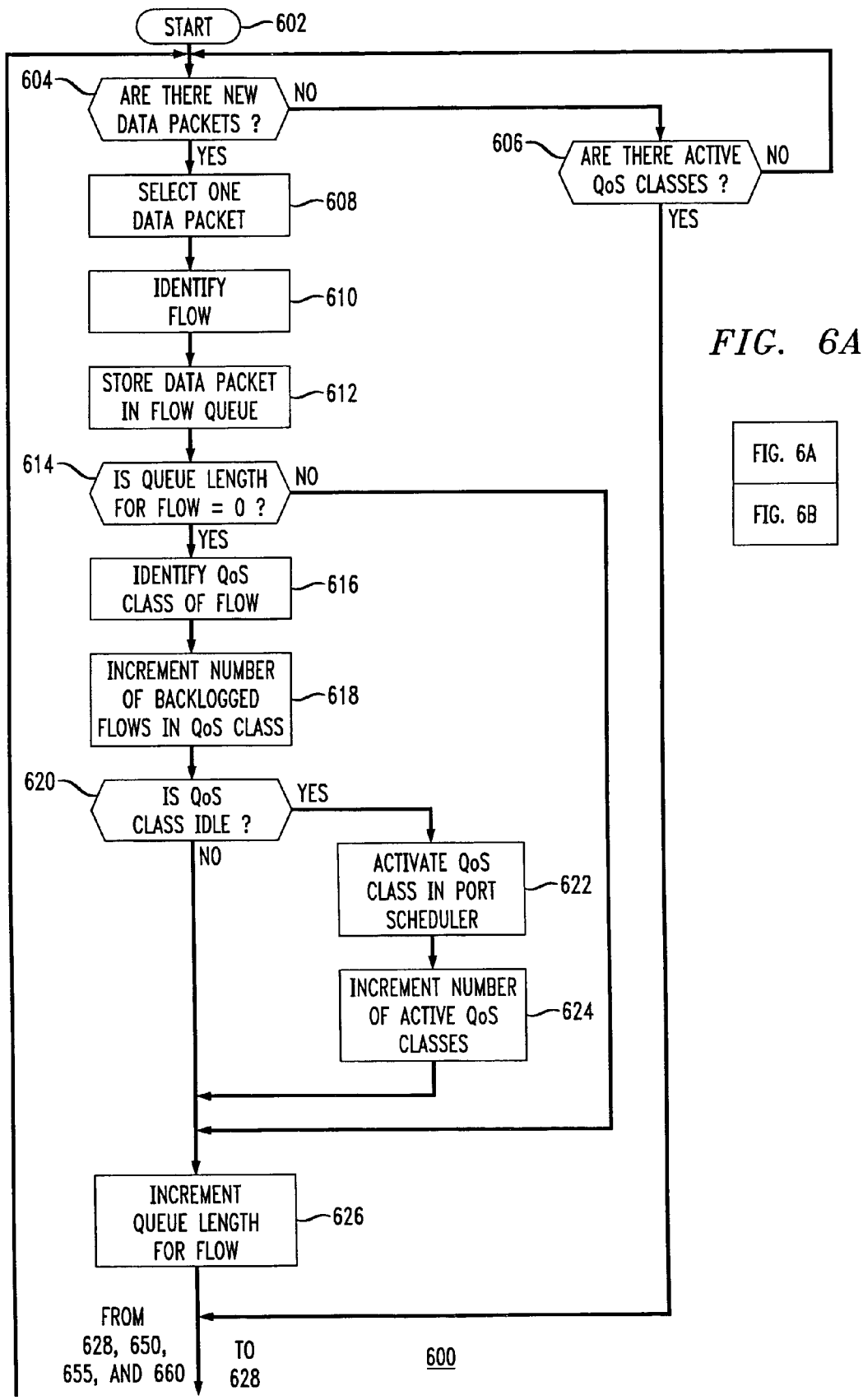
FIGS. 6A and 6B, taken together, depict a flow diagram of a scheduling method suitable for use in the ingress port card of FIG. 2.
Figure 6B:
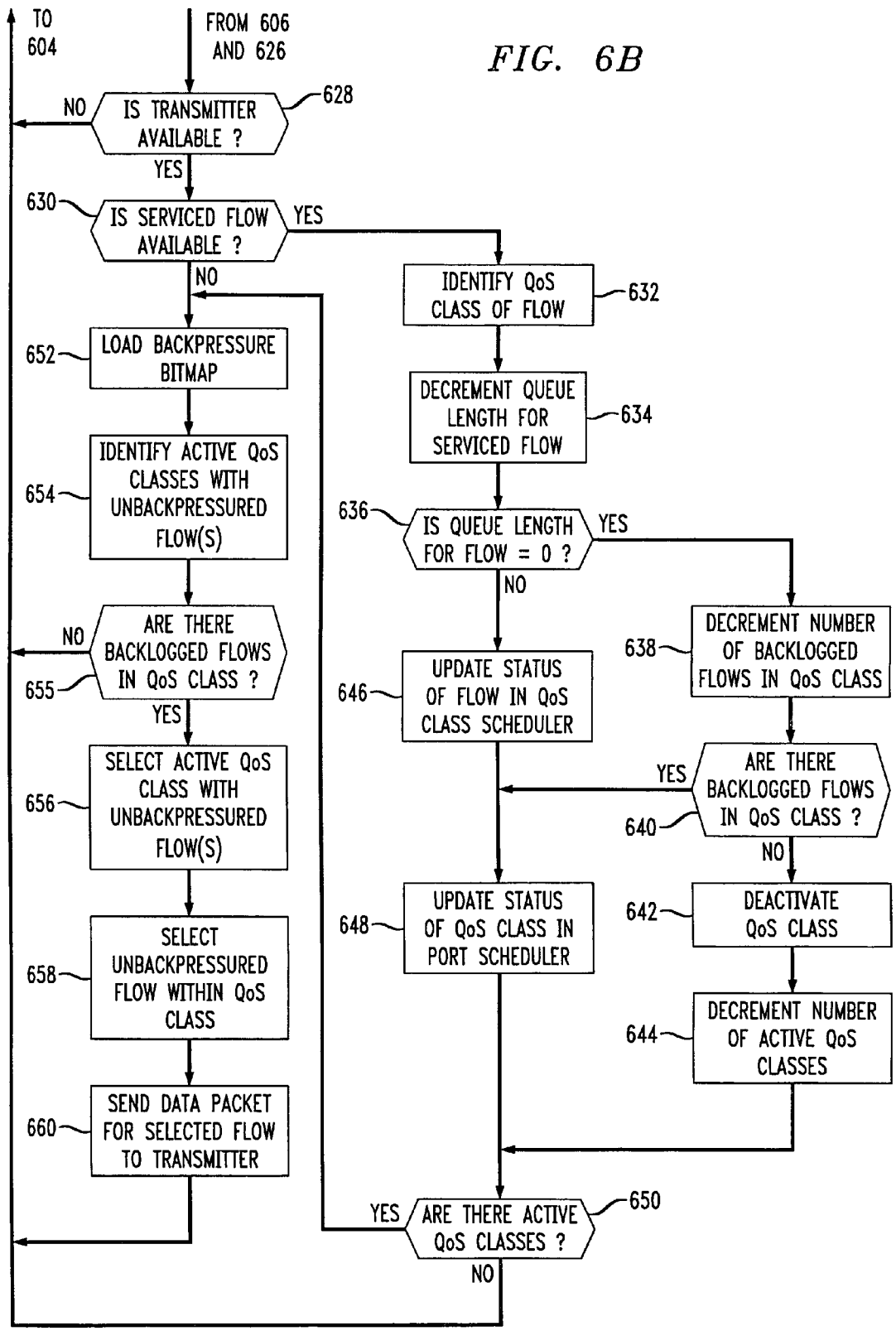

FIGS. 6A and 6B, taken together, depict a flow diagram of a traffic-flow election method 600 suitable for use in the ingress port card of FIG. 2. Specifically, the traffic-flow selection method 600 is suitable for use within the lass schedulers 220 and port scheduler 210 of the ingress port card of FIG. 1.

The method 600 is initiated at step 602 and proceeds to step 604. At step 604, a query is made as to whether any new data packets have arrived at the ingress port card. If the query at step 604 is answered negatively, then the method proceeds to step 606. If the query at step 604 is answered affirmatively, then method 600 proceeds to step 608.

At step 606, a query is made as to whether there are active QoS classes. If the query at step 606 is answered affirmatively, indicating that there is at least one traffic flow within a QoS class that has data packets waiting to be transmitted, then the method proceeds to step 628. If the query at step 606 is answered negatively, indicating that there are no data packets waiting to be transmitted for any of the traffic flows configured in the port card, then the method 600 proceeds to step 604 where a query is made to determine whether new data packets have arrived.

At step 608, the packet switch selects an arrived data packet. More than one packet could have arrived since a packet was previously selected at the input of the ingress port card, but packets are processed individually. The data packet header is then examined at step 610 to identify the traffic flow that the data packet belongs to. The method 600 then proceeds to step 612 where the arriving data packet is stored in the appropriate flow queue based on the data packet's header information.

At step 614, after placing the arriving packet in the appropriate flow queue, a query is made to determine whether the identified flow queue is currently empty or contains data packets. For example, one of the plurality of counters 230-CNT that monitors the number of data packets contained in the identified flow queue is examined to determine whether the flow queue is empty or not. If the query at step 614 is answered negatively, indicating that data packets are contained in the identified flow queue, then the method 600 proceeds to step 626. If the query at step 614 is answered affirmatively, indicating that no data packets exist in the identified flow queue, then the method 600 proceeds to step 616 where the QoS class of the traffic flow of the data packet is identified.

At step 618, one of the plurality of counters 240-CNT that monitors the number of flow queues within the identified QoS class that has data packets waiting to be transmitted is incremented to indicate that the data packet has been added to a flow queue that was previously empty. A QoS class with data packets waiting to be transmitted is considered as being active. The method 600 then proceeds to step 620.

At step 620, a query is made as to whether the identified QoS class is idle. If the query at step 620 is answered negatively, indicating that there are data packets within the QoS class that are waiting for transmission, then method 600 proceeds to step 626. If the query at step 620 is answered affirmatively, indicating that there were no data packets waiting for transmission before the arriving data packet was assigned to a traffic flow in that QoS class, then the method 600 proceeds to step 622.

At step 622, the status of the QoS class the arriving packet was placed in is changed to indicate that the QoS class is now active. This allows the port scheduler 210 to know that the QoS class is now available for service. The method 600 proceeds to step 624 where the counter 245-CNT for counting the number of active QoS classes is incremented.

After incrementing the number of active QoS classes (step 624), determining that a queue length for a flow is not zero (step 614), or determining that a QoS class is idle (step 620), the method 600 proceeds to step 626 where the counter of the plurality of counters 230-CNT that keeps track of the number of packets in the identified flow queue is incremented. The method 600 then proceeds to step 628.

At step 628 a query is made to determine whether a first transmitter 250-TRAN is available for transmission of a new packet. The first transmitter 250-TRAN is the device that transmits packets from the ingress port card 110 to the switch fabric 120. If the query at step 628 is answered negatively, indicating that the first transmitter 250-TRAN is currently transmitting other data packets, then the method 600 proceeds to step 604. If the query at step 628 is answered affirmatively, indicating that the first transmitter 250-RAN is available to transmit a new data packet to the switch fabric 120, then the method 600 proceeds to step 630.

At step 630 a query is made as to whether a serviced traffic flow is available at the first transmitter 250-TRAN. For example, availability of the serviced traffic flow at the first transmitter 250-TRAN is dependent on whether post-service processing has been already executed on the traffic flow. When the first transmitter 250-TRAN completes the transmission of the data packet, the first transmitter 250-TRAN checks whether the traffic flow the data packet was selected from has been processed. If the query at step 630 is answered negatively, indicating that the serviced flow has been processed, then the method 600 proceeds to step 652. If the query at step 630 is answered affirmatively, indicating that the serviced flow has not been processed, then the method 600 proceeds to step 632.

At step 652 a new data packet to be transmitted has to be identified. The backpressure bitmap transmitted by the switch fabric 120 is used in the process that identifies the next traffic flow to serve. As previously mentioned, the switch fabric 120 transmits to the ingress port cards 110 a backpressure bitmap which informs the per-output subgroup of traffic flows from which the transmitted data packet came whether the switch fabric 120 can or cannot continue to receive packets from the per-output subgroup. In the backpressure bitmap, depending on the convention in use, either a one or a zero bit can indicate congestion in a QoS channel queue of the switch fabric 120. The method 600 then proceeds to step 654.

At step 654 active QoS classes with at least one backlogged non-backpressured flow queue are identified. That is, at step 654 QoS classes having at least one flow queue with data packets waiting to be transmitted must be identified. Furthermore, since backpressured flows cannot be selected for transmission of one of their packets, non-backpressured flows must also be identified. The method 600 then proceeds to step 655.

At step 655 a query is made as to whether an active QoS class with non-backpressured traffic flows is available. If the query at step 655 is answered negatively, indicating that no QoS class with non-backpressured backlogged traffic flows is available, then the method 600 proceeds to step 604. If the query at step 655 is answered affirmatively, indicating that at least one QoS class with non-backpressured backlogged traffic flows is available, then the method 600 proceeds to step 656.

It should be noted that the deployment of per-flow scheduling within each QoS class allows the enforcement of isolation among competing traffic flows of the same QoS class, so that the QoS guarantees of contract-compliant traffic sources are never affected by the activity of contract-incompliant traffic flows in the same QoS class.

At step 656 a QoS class having non-backpressured flows is selected for service using the port scheduler 210. The method 600 then proceeds to step 658 where a specific non-backpressured traffic flow is selected from the QoS class selected in step 656. The method 600 then proceeds to step 660.

At step 660 the data packet at the head of the flow queue for the traffic flow identified in step 658 is passed to the first transmitter 250-TRAN for transmission to the switch fabric 120. The method 600 then proceeds to step 604.

At step 632 the QoS class for the last serviced traffic flow is identified. The purpose of identifying the QoS class for the traffic flow is to update the backlog and scheduling status of the QoS class that includes the last serviced traffic flow. The method 600 then proceeds to step 634.

At step 634 the counter of the plurality of counters 230-CNT that keeps track of the number of packets in the identified flow queue is decreased by one unit to reflect that a data packet was previously transmitted. The method 600 then proceeds to step 636.

At step 636 a query is made to determine whether the length of the flow queue associated with the last serviced traffic flow has gone to zero. If the query at step 636 is answered affirmatively, indicating that the flow has become idle after being backlogged as a result of the latest data-packet transmission, then the method 600 proceeds to step 638 where the number of backlogged flows in that particular QoS class, maintained in a counter of a plurality of counters 240-CNT, is decreased to reflect that the length of the flow queue has gone to zero. If the query at step 636 is answered negatively, indicating that the flow has not become idle after being backlogged, then the method 600 proceeds to step 646.

At step 646 the status of the traffic flow is updated in relation to the class scheduler 220 in order for the class scheduler 220 to get ready for the next selection within that QoS class.

At step 640 a query is made as to whether there are any backlogged flows in the QoS class of the last serviced traffic flow. If the query at step 640 is answered affirmatively, then the method 600 proceeds to step 648. If the query at step 640 is answered negatively, then the method 600 proceeds to step 642 where the status of the QoS class is changed from active to idle because there are no longer flows within that QoS class having data packets waiting to be transmitted.

At step 644 the number of active QoS classes is decreased by one unit. That is the counter 245-CNT that monitors the number of active QoS classes in the port card is decreased by one unit.

After updating the status of the last serviced traffic flow in the class scheduler 220 (step 646) or determining that there are backlogged flows in the QoS class (step 640), the method 600 proceeds to step 648, where the status of the QoS class in the port scheduler 210 is updated in order for the port scheduler 210 to get ready for the next selection of a QoS class.

After updating the status of the QoS class of the last serviced traffic flow in the port scheduler 210 (step 648) or decreasing the number of active QoS classes (step 644), the method 600 proceeds to step 650. A query is made at step 650 to determine whether there are active QoS classes. If the query at step 650 is answered negatively, then the method 600 proceeds to step 604. If the query at step 650 is answered affirmatively, the method 600 proceeds to step 652.

Figure 7A:
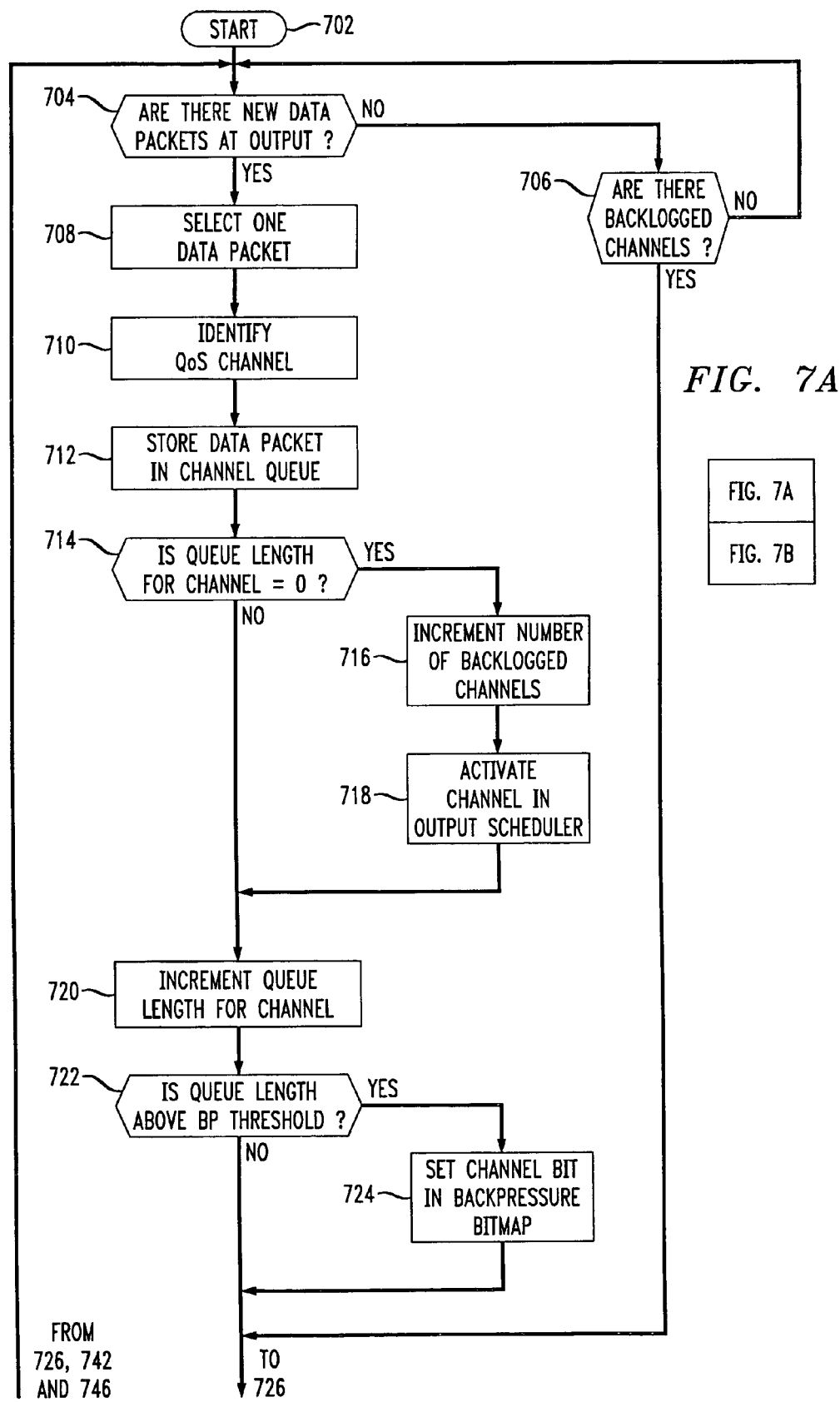
FIGS. 7A and 7B, taken together, depict a flow diagram of a scheduling method suitable for use at an output port of the switch fabric of FIG. 3.
Figure 7B:
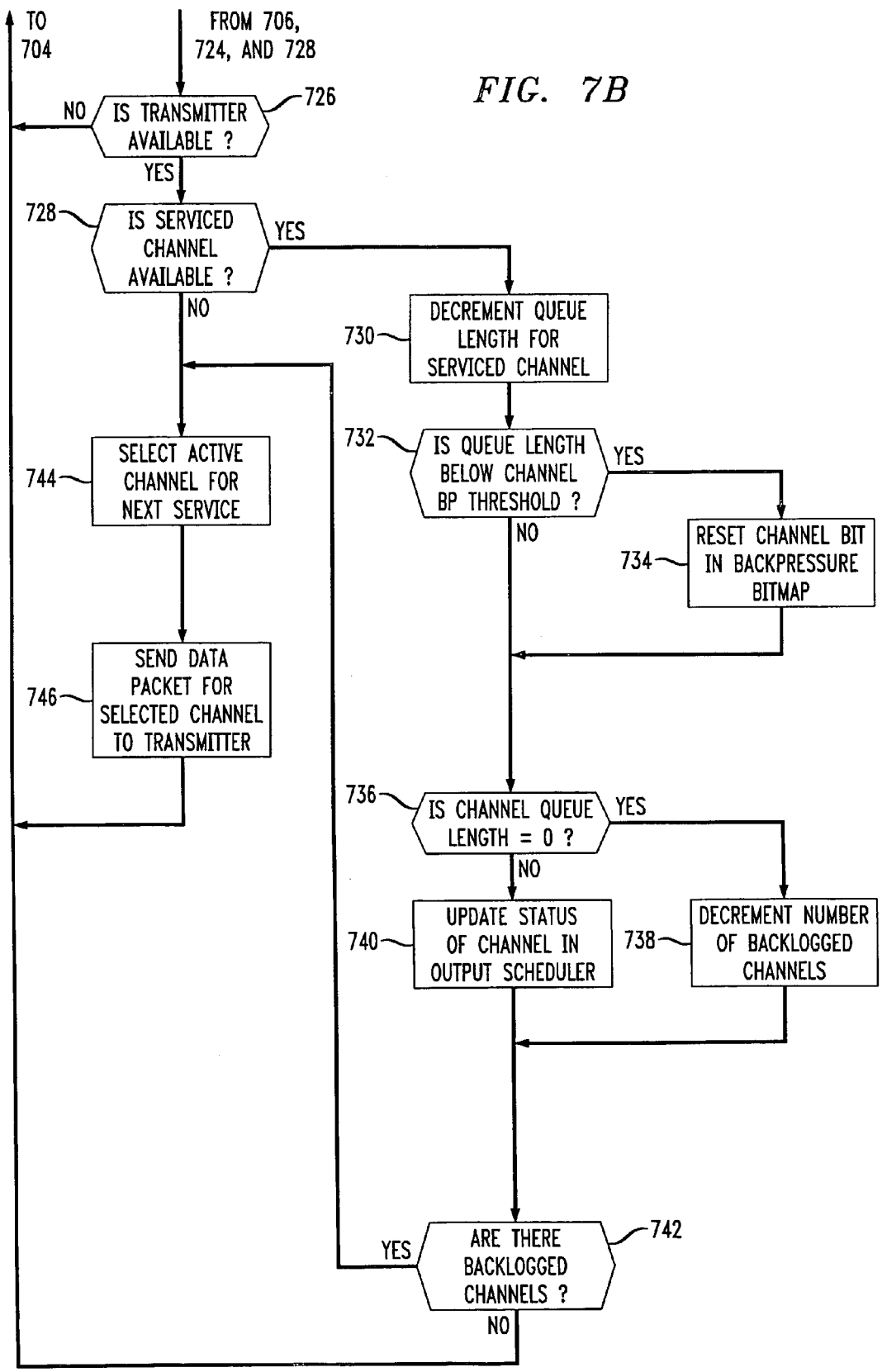

FIGS. 7A and 7B, taken together, depict a flow diagram of a QoS-channel selection method 700 suitable for use at one of a plurality of switch fabric outputs 120-OUT shown in FIG. 3.

The QoS-channel selection method 700 is initiated at step 702 and proceeds to step 704, where a query is made to determine whether new data packets have arrived at the switch fabric output 120-OUT. If the query at step 704 is answered affirmatively, indicating that data packets have arrived at the switch fabric output 120-OUT, then the method 700 proceeds to step 708. If the query at step 704 is answered negatively, then the method 700 proceeds to step 706.

At step 706 a query is made to determine whether there is a backlogged QoS channel queue at the switch fabric output 120-OUT. If the query at step 706 is answered negatively, indicating that there are no QoS channels waiting to be serviced at the switch output 120-OUT, then the method 700 proceeds to step 704. If the query at step 706 is answered affirmatively, indicating that there is at least one QoS channel queue with one or more packets waiting to be transmitted to an egress port card 130, then method 700 proceeds to step 726.

At step 708 the packet switch selects a new data packet. More than one packet could have arrived since a packet was previously selected for insertion in one of the QoS channels associated with the switch fabric output 120-OUT, but packets are selected individually. The method 700 then proceeds to step 710.

At step 710 the data packet header is examined to identify the destination QoS channel of the packet. In passing from ingress port cards 110 to the switch fabric 120, local information may be added to the header of the transferred data packets so that the switch fabric 120 knows where to route the data packets. The method 700 then proceeds to step 712.

As previously mentioned in a discussion of FIG. 3, the traffic aggregate of a given QoS class from each input to each output is referred to as a QoS channel. Each QoS channel corresponds to a separate FIFO queue of packets in the switch fabric 120.

At step 712 the arriving data packet is stored in the appropriate QoS channel queue based on the header information of the packet, and more specifically on the ingress port card 110 from which the packet was received and on the QoS class that includes the traffic flow of the packet. The method 700 then proceeds to step 714.

At step 714 a query is made as to whether the length of the QoS channel queue that is receiving the packet is zero. That is, whether the QoS channel queue was empty before receiving the arriving packet. If the query at step 714 is answered negatively, then the method 700 proceeds to step 720. If the query at step 714 is answered affirmatively, then the method 700 proceeds to step 716 where the number of backlogged QoS channels at the switch output 120-OUT is incremented. That is, the counter of a plurality of counters 350-CNT that keeps track of the number of backlogged QoS channels at the corresponding one of switch outputs 120-OUT is incremented by one with the addition of the arriving data packet to a QoS channel queue that was previously empty. The method 700 then proceeds to step 718.

At step 718 the output scheduler 310 is notified that there is an additional QoS channel queue that must be considered for service because the QoS channel queue has just become backlogged.

After activating the QoS channel in the output scheduler 310 (step 718) or determining that the length of the QoS channel queue is not zero (step 714), the method 700 proceeds to step 720 where the counter of a plurality of counters 330-CNT that monitors the number of packets in the QoS channel queue is incremented by one.

At step 722 a query is made to determine whether the length of the QoS channel queue receiving the new data packet is above the backpressure threshold associated with that particular QoS channel queue. If the query at step 722 is answered affirmatively, indicating that the QoS channel queue is congested, then the method 700 proceeds to step 726. If the query to step 722 is answered negatively, indicating that the QoS channel queue is not congested and can continue to receive data packets, then the method 700 proceeds to step 724.

At step 724 the bit corresponding to the QoS channel in the backpressure bitmap is set. That is, since a determination has been made that the QoS channel queue exceeds the backpressure threshold, an indication has to be transmitted to the respective ingress port card that the QoS channel queue is congested. This indication is in the form of a change of bit state. The bit state can be either a one or a zero depending on the convention being in use. The important thing is that the new status of the bit must indicate that backpressure is asserted for that particular QoS channel queue until congestion is removed.

After setting the channel bit in the backpressure bitmap (step 724) or determining that the length of the QoS channel queue is not above the backpressure threshold (step 722), the method 700 proceeds to step 726.

At step 726 a query is made as to whether a second transmitter 350-TRAN is available for transmitting a data packet from a QoS channel queue to the corresponding one of the egress port cards 130. If the query at step 726 is answered negatively, indicating that the second transmitter 350-TRAN is currently in use and is therefore unavailable, then the method 700 proceeds to step 704. If the query at step 726 is answered affirmatively, it indicates that the second transmitter 350-TRAN is available to transmit a new data packet from any of the QoS channel queues associated with the switch fabric output 120-OUT to the corresponding egress port card 130.

At step 728 a query is made as to whether a serviced QoS channel is available at the second transmitter 350-TRAN. That is whether the QoS channel queue involved in the latest transmission of a data packet to the egress port card 130 still needs to be processed in the scheduler. If the query at step 728 is answered negatively, indicating that no QoS channel requires further processing, then the method 700 proceeds to step 744. If the query at step 728 is answered affirmatively, indicating that a QoS channel still has to be processed, then the method 700 proceeds to step 730.

At step 730 one of the a plurality of counters 330-CNT that tracks the number of packets in the QoS channel queue is decreased by one to indicate that the number of packets in the QoS channel queue has decreased by one nit. The method 700 then proceeds to step 732.

At step 732 a query is made as to whether the length of the last serviced QoS channel queue has fallen below the backpressure threshold associated with the same QoS channel queue. If the query at step 732 is answered negatively, then the method proceeds to step 736. If the query at step 732 is answered affirmatively, then the method 700 proceeds to step 734 where the bitmap entry that corresponds to the latest serviced QoS channel queue is modified. This allows one of the ingress port cards 110 to resume transmission to the previously congested QoS channel queue as a result of the data packet having been transmitted out of the previously congested queue.

After resetting the channel bit in the backpressure bitmap (step 734) or determining that the length of the QoS channel queue has not fallen below the backpressure threshold (step 732), the method 700 proceeds to step 736. At step 736 a query is made as to whether the length of the last serviced QoS channel queue is zero. If the query at step 736 is answered affirmatively, then the method 700 proceeds to step 738 where a counter of a plurality of counters 350-CNT for monitoring the number of backlogged QoS channel queues at switch fabric output 120-OUT is decreased by one. If the query at step 736 is answered negatively, then the method 700 proceeds to step 740 where the status of the QoS channel is updated in the output scheduler 310. The output scheduler 310 will have at least one backlogged QoS channel available for the next selection because the last serviced QoS channel did not go idle.

At step 742 a query is made as to whether there is a backlogged QoS channel queue. If the query at step 742 is answered negatively, indicating that there are no data packets in any of the QoS channel queues waiting for transmission, then method 700 proceeds to step 704. If the query at step 742 is answered affirmatively, then the method 700 proceeds to step 744.

After determining that a last serviced QoS channel is not available for post-service processing (step 728) or determining that there is a backlogged QoS channel queue (step 742), the method 700 proceeds to step 744 where it selects for service a new QoS channel with the output scheduler 310.

At step 746 a data packet from the QoS channel selected at step 744 is passed to the second transmitter 350-TRAN for transmission to the egress port card 130. The method 700 then proceeds to step 704.

Figure 8:
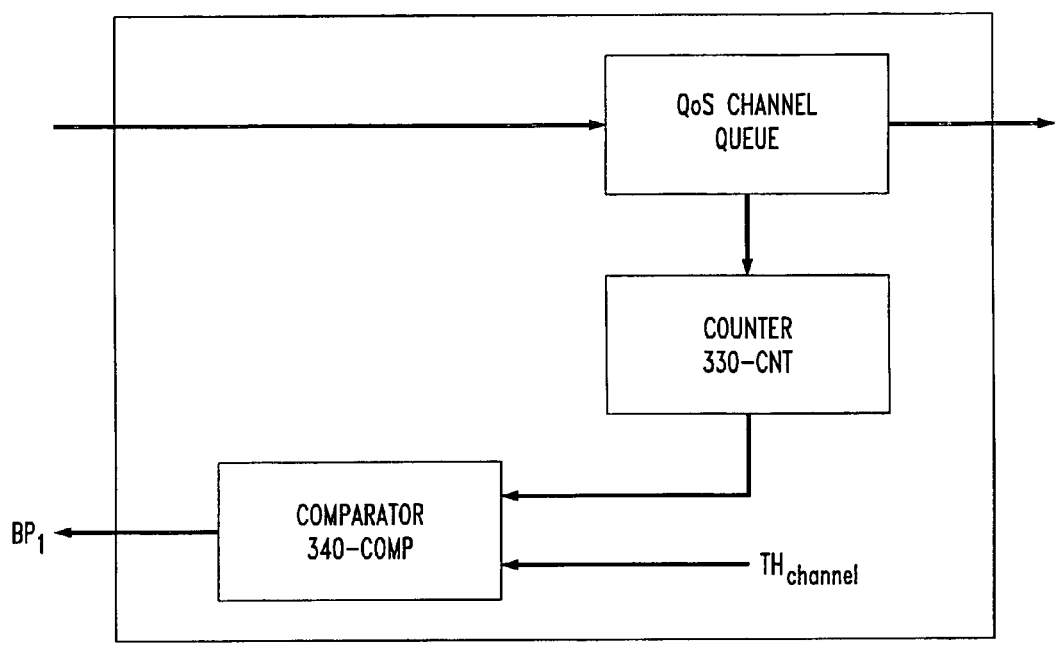
FIG. 8 depicts a high-level block diagram of a buffer-management device suitable for use in the switch fabric output of FIG. 3.

FIG. 8 depicts a high-level block diagram of a buffer utilization device suitable for use in association with each QoS channel in the switch fabric output 120-OUT of FIG. 3. With reference to the first group of QoS channels associated with ingress port card $110_1$ in FIG. 3, the buffer utilization device comprises a QoS channel queue 320 having an input and an output, and a counter 330-CNT providing an output to a first input of a comparator 340-COMP. The comparator 340-COMP has a second input for receiving a $Th_{channel}$ signal and also has an output for providing a backpressure signal BP1.

When a packet is placed in one of the QoS channel queues 320, the counter 330-CNT is increased as described in more detail above with respect to FIGS. 7A and 7B. The comparator 340-COMP compares the level of the QoS channel queue 320, available in the counter 330-CNT, with a threshold signal $Th_{channel}$ for the particular QoS channel queue 320. If the level of the queue is below the $Th_{channel}$ signal value, packets can continue to be transmitted to the QoS channel queue. If the level of the QoS channel queue is above the $Th_{channel}$ signal value, the comparator 340-COMP provides a backpressure signal BPS to the corresponding ingress port card $110_1$, and enforces a stop in the transmission of packets to the QoS channel queue from the ingress port card. The stop-transmission signal is asserted until the occupation of the QoS channel queue falls below the $Th_{channel}$ Signal value.

The above described invention advantageously provides differentiated QoS guarantees in scalable packet switches. Moreover, the invention advantageously distributes a network of schedulers operating in agreement with one another over a multitude of contention points. In this manner, the invention provides a substantial improvement over prior-art scheduling apparatuses and methods, thereby enforcing a heterogeneous set of QoS guarantees on configured traffic flows.

Although various embodiments, which incorporate the teachings of the present invention, have been shown and described in detail herein, those skilled in the art can readily devise many other varied embodiments that still incorporate these teachings.

What is claimed is:

1. A method for transferring data through a packet switch while providing differentiated Quality-of-Service (QoS) guarantees to respective traffic flows received at individual inputs of the packet switch, the method comprising the steps of:
   storing received data packets associated with said traffic flows in a respective input buffer wherein each respective input buffer resides in an ingress port card and is associated with a particular individual input of the packet switch;
   grouping said traffic flows within a respective input butter on at least a QoS guarantee basis;
   selecting stored data packets for transmission to a switch fabric according to a first plurality of schedulers, each scheduler in the first plurality of schedulers residing in said ingress port cards;
   assigning bandwidth to said selected data packets according to a second plurality of schedulers, each scheduler in the second plurality of schedulers residing in said ingress port cards;
   storing said selected data packets in a plurality of output buffers in said switch fabric, wherein the buffer capacity of the plurality of input buffers exceeds the buffer capacity of said plurality of output buffers;
   adapting the operation of at least one of said first and second schedulers in response to a determination that a utilization level of any output buffer has exceeded a threshold parameter; and
   choosing the data packets to be transmitted out of said plurality of output buffers according to a third plurality of schedulers, each scheduler of the third plurality of schedulers residing in said switch fabric.

2. The method of claim 1, wherein said step of grouping comprises the step of grouping said traffic flows according to traffic flow destination and QoS requirements.

3. The method of claim 2, wherein said destination comprises an output of an egress port card coupled to said switch fabric.

4. The method of claim 1, wherein each scheduler in said first plurality of schedulers is a class-specific per-flow scheduler.

5. The method of claim 1, wherein each scheduler in said second plurality of schedulers is a per-QoS-class port scheduler.

6. The method of claim 2, wherein each of said second plurality of schedulers comprises at least one of:
   a Guaranteed Bandwidth Scheduler (GBS) for selecting said groups of configured traffic flows for transmission of data packets based on minimum bandwidth guarantees for the QoS channels;
   an Excess Bandwidth Scheduler (EBS), for redistributing the unused GBS bandwidth to QoS channels waiting for transmission of data packets to said respective plurality of output buffers; and
   a priority scheduler for assigning priority to the GBS over the EBS for the transmission of data packets.

7. The method of claim 1, wherein each of said third plurality of schedulers comprises at least one of:
   a Guaranteed Bandwidth Scheduler (GBS), for selecting said groups of configured traffic flows for transmission of data packets based on minimum bandwidth guarantees for the QoS channels;
   an Excess Bandwidth Scheduler (EBS), for redistributing the unused GBS bandwidth to QoS channels waiting for transmission of data packets from said respective plurality of output buffers; and
   a priority scheduler for assigning priority to the GBS over the EBS for the transmission of data packets.

8. The method of claim 1, wherein if said threshold parameter has been exceeded in any of said plurality of output buffers, said method further comprises the steps of:
   applying selective backpressure to respective ingress port cards to prevent further transmission of data packets to any of said respective plurality of output buffers for which the respective threshold parameter has been exceeded being congested;
   determining whether said respective threshold level of each of said congested plurality of output buffers continues to be exceeded; and
   resuming transmission to any congested respective plurality of output buffers when each respective said threshold parameter is not exceeded.

9. The method of claim 1, wherein said switch fabric comprises at least one module having a respective plurality of output buffers.

10. The method of claim 1, wherein each of said first plurality of schedulers is associated with a respective QoS class.

11. The method of claim 1, wherein each of said plurality of output buffers supports aggregated traffic flows of a defined QoS class.

12. The method of claim 1, wherein each one of said third plurality of schedulers is associated with a respective output of said switch fabric.

13. An apparatus for transferring data packets through a packet switch while providing differentiated Quality-of-Service (QoS) guarantees, comprising:
   a first plurality of schedulers for selecting traffic flows arranged in groups based on a particular packet switch input at which the traffic flows are received and at least a QoS guarantee basis;
   a second plurality of schedulers coupled to said first plurality of schedulers for assigning bandwidth to said selected groups of traffic flows;
   a plurality of input buffers, coupled to said first and second pluralities of schedulers, for holding data packets associated with said grouped traffic flows;
   a third plurality of schedulers, for selecting data packets for transmission to respective output ports;
   a plurality of output buffers, coupled to said third plurality of schedulers, for holding data packets before transmission to said respective output ports, wherein the buffer capacity of said plurality of input buffers exceeds the buffer capacity of said plurality of output buffers; and
   a backpressure-signal circuit connected between each of said respective plurality of output buffers and each of said respective plurality of input buffers, transmitting a stop-transmission signal to each of said respective plurality of input buffers when a threshold parameter in any of said respective plurality of output buffers is exceeded.

14. The apparatus of claim 13, wherein:
   said first plurality of schedulers resides in ingress port cards;
   said second plurality of schedulers resides in said ingress port cards;
   said plurality of input buffers reside in said ingress port cards;

said third plurality of schedulers resides in a switch fabric;
said output ports reside in said switch fabric;
said plurality of output buffers reside in said switch fabric; and
said ingress port cards are coupled to said switch fabric.

15. The apparatus of claim 13, wherein each of said second plurality of schedulers comprises at least one of:
   a Guaranteed Bandwidth Scheduler (GBS), for selecting said groups of configured flows for transmission of data packets based on minimum bandwidth guarantees for QoS classes;
   an Excess Bandwidth Scheduler (EBS), for redistributing unused GBS bandwidth to QoS classes waiting for transmission of data packets to said respective plurality of output buffers; and
   a priority scheduler for assigning priority to the GBS over the EBS for the transmission of data packets.

16. The system of claim 13, wherein each of said third plurality of schedulers comprises at least one of:
   a Guaranteed Bandwidth Scheduler (GBS), for selecting data packets for transmission based on minimum bandwidth guarantees for QoS channels;
   an Excess Bandwidth Scheduler (EBS), for redistributing unused GBS bandwidth to QoS channels waiting for transmission of data packets from said respective plurality of output buffers; and
   a priority scheduler for assigning priority to the GBS over the EBS for the transmission of data packets.

17. The apparatus of claim 14, wherein said switch fabric comprises a single module with a plurality of output buffers.

18. The system of claim 14, wherein said switch fabric comprises multiple modules having a plurality of output buffers.

19. The system of claim 13, wherein each one of said first plurality of schedulers is associated with a respective QoS class of said configured flows.

20. The apparatus of claim 13, wherein said plurality of output buffers are coupled to traffic aggregates called QoS channels.

21. The apparatus of claim 13, wherein each one of said third plurality of schedulers is associated with a respective output of said switch fabric.

* * * * *